(12) United States Patent
Jin

(10) Patent No.: US 8,165,757 B2
(45) Date of Patent: Apr. 24, 2012

(54) APPARATUS FOR IMPLEMENTING INTERLOCK OF ELECTRIC POWER STEERING SYSTEM

(75) Inventor: Jong-hak Jin, Hwaseong (KR)

(73) Assignee: Mando Corporation, Pyeongtaek-si (KR)

( * ) Notice: Subject to any disclaimer, the term of this patent is extended or adjusted under 35 U.S.C. 154(b) by 446 days.

(21) Appl. No.: 12/538,383

(22) Filed: Aug. 10, 2009

(65) Prior Publication Data
US 2010/0094506 A1      Apr. 15, 2010

(30) Foreign Application Priority Data
Oct. 10, 2008  (KR) .................. 10-2008-0099566

(51) Int. Cl.
*B62D 5/04* (2006.01)
(52) U.S. Cl. .......................... 701/42; 180/443
(58) Field of Classification Search ............ 701/41–44; 180/443–446; *B62D 5/00, 5/04*
See application file for complete search history.

(56) References Cited

U.S. PATENT DOCUMENTS

| | | | |
|---|---|---|---|
| 6,448,738 B1* | 9/2002 | Burton et al. ................ | 318/807 |
| 7,577,505 B2* | 8/2009 | Nagase .......................... | 701/41 |
| 2005/0174083 A1* | 8/2005 | Sato .............................. | 318/565 |
| 2006/0076182 A1* | 4/2006 | Kifuku et al. ................. | 180/446 |
| 2009/0240389 A1* | 9/2009 | Nomura et al. ................ | 701/29 |
| 2011/0077825 A1* | 3/2011 | Sano ............................. | 701/42 |
| 2011/0118940 A1* | 5/2011 | Kariatsumari et al. ......... | 701/42 |

\* cited by examiner

*Primary Examiner* — Mark Hellner
*Assistant Examiner* — Ari M. Diacou
(74) *Attorney, Agent, or Firm* — McDermott Will & Emery LLP

(57) ABSTRACT

An apparatus for implementing interlock of an electric power steering system is disclosed. The interlock apparatus can generate the output torque current value for achieving the steering system interlock with current values of two phases and the rectifying positional value for the 1-bit feedback current of one phase out of the 3-phase feedback current values and the rectifying positional value for the 3-bit 3-phase feedback current values. The disclosed interlock apparatus receives the 3-phase feedback current values from the current sensor and the rectifying positional values for the 3-bit 3-phase feedback current values from the rectifying positional sensor, and retrieves therefrom the current values of two phases and the rectifying positional value for the 1-bit feedback current of one phase for use with a substantially cost effective processor in generating the output torque current value.

4 Claims, 5 Drawing Sheets

FIG.3

$i_a = I_{Max} \sin(\theta)$
$i_b = I_{Max} \sin\left(\theta - \frac{2}{3}\pi\right)$
$i_c = I_{Max} \sin\left(\theta - \frac{4}{3}\pi\right)$ Clark Transformation $i_\alpha = i_a$
$i_\beta = \frac{1}{\sqrt{3}} i_a + \frac{2}{\sqrt{3}} i_b$ Park Transformation $i_d = i_\alpha \times \cos(\theta) + i_\beta \times \sin(\theta)$
$i_q = i_\beta \times \cos(\theta) - i_\alpha \times \sin(\theta)$

FIG.5
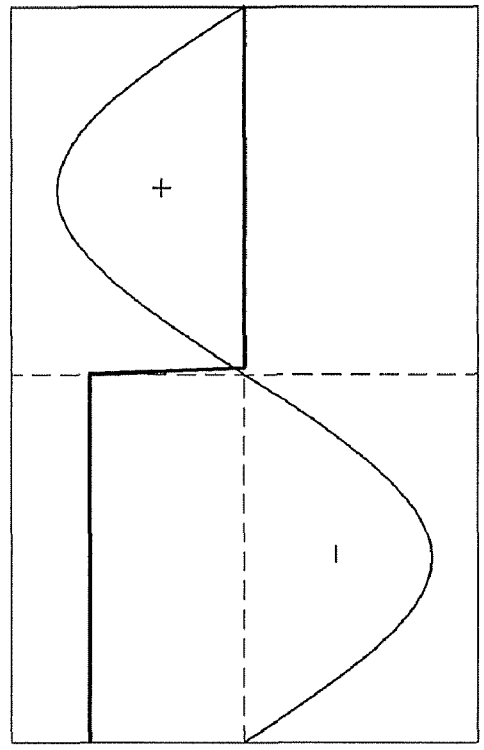
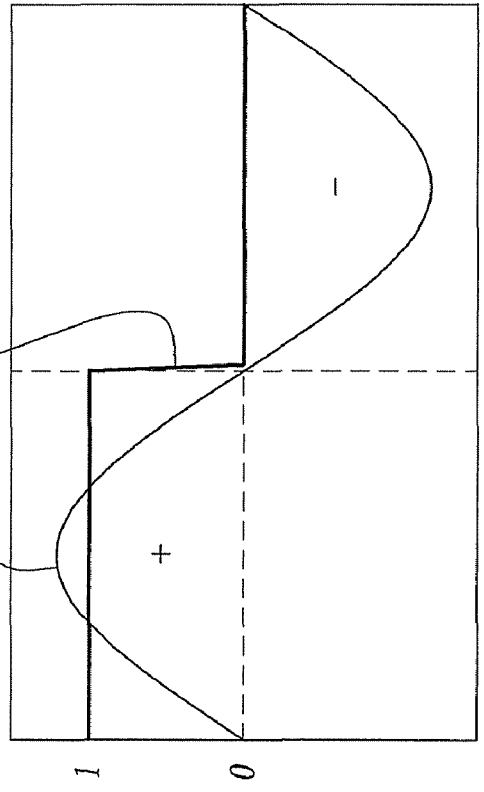

APPARATUS FOR IMPLEMENTING INTERLOCK OF ELECTRIC POWER STEERING SYSTEM

TECHNICAL FIELD

The present disclosure relates to an apparatus for implementing interlock of an electric power steering system. More particularly, the present disclosure relates to an apparatus for inhibiting the operation of an electric power steering system by implementing the interlock at the event of an abnormality of the system in order to secure the drivers' safety.

BACKGROUND OF THE DISCLOSURE

FIG. 1 is a block diagram for schematically showing the internal construction of an electric power steering (EPS) system for vehicles. The electric power steering system includes a torque sensor 110, an electronic controller unit (ECU) 120 and an EPS motor 130. The ECU 120 then comprises a micro controller unit (MCU) 122, a motor driver 124, a conventional interlock apparatus 126 and a current sensor 128. Of these components, the conventional interlock apparatus 126 will inhibit the operation of the electric power steering system in case of a system abnormality for the sake of the drivers' safety.

To be more specific, the conventional interlock apparatus 126 monitors the control of the EPS motor 130 by the MCI 122 whether it is carried out within normal premises (control-allowed area) as illustrated in FIG. 2 where a comparison is made between the torque sensor output and the feedback current value back from the EPS motor 130 to see when the EPS motor 130 output with respect to the torques sensor output resides in abnormal premises (control-inhibit area) to override the control by the MCU 122 and normalize the EPS motor 130 output torque toward the normal premises.

If the EPS motor 130 were of 3-phase, even with its output torque remained constant the feedback current value detected by current sensor 128 will characteristically vary as the motor's rotor changes position.

The phase current value of the 3-phase motor comprises phase currents $i_a$, $i_b$ and $i_c$ as shown in FIG. 3 where the conventional interlock apparatus 126 has been arranged to represent the output torque of the EPS motor 130 with one of these phase current values through Clark transformation and Park transformation performed on 3-phase feedback current values using a precise rotor position "θ" of FIG. 3 of the motor to convert the 3-phase feedback current or the three parameters $i_a$, $i_b$ and $i_c$ into two types of current value or a value of two phases which are an output torque current value (see FIG. 3 $i_q$) and a reactive current value ($i_d$), whereby with the reactive current remained constant the output torque current value was made to represent the output torque of the EPS motor 130. Here, the output torque current value means the amount of the effective current of the supplied current to generate the output torque of the EPS motor 130 and the reactive current means the current portion supplied to EPS motor 130 contributing none to the output torque.

This necessitated the conventional interlock apparatus 126 of the electric power steering system to perform calculations shown in FIG. 3 and process signals of the highly precise motor position sensor such as a relative angular sensor. In order to realize the FIG. 3 calculation and the signal processing of such precision motor positional sensor, a high performance processor was needed.

Therefore, the high performance processor used with the conventional interlock apparatus 126 bounds to lift the unit manufacturing cost of the electric power steering systems.

DISCLOSURE OF THE INVENTION

In order to solve the described problems, the disclosure seeks to provide an apparatus for implementing interlock of an electric power steering system which can generate the output torque current value for achieving the steering system interlock needing to use current values of only two phases and the rectifying positional value for the 1-bit feedback current of one phase out of the 3-phase feedback current values and the rectifying positional value for the 3-bit feedback current values of three phases.

The present disclosure provides an apparatus for implementing an interlock of an electric power steering system and comprises an interface for receiving a torque sensor output from a torque sensor of the electric power steering system, a 3-phase feedback current including values Ia, Ib and Ic from a current sensor of the electric power steering system, and a rectifying positional value for the 3-phase feedback current from a rectifying positional sensor of the electric power steering system; a memory for storing a program for implementing the interlock of the electric power steering system; and a controller for executing a controlled implementation of the interlock of the electric power steering system through executing the program for implementing the interlock to calculate the absolute value of an output torque current value using the values Ia and Ib of the 3-phase feedback current, determining the direction of the output torque current by using a rectifying positional value for a feedback current of one phase in the rectifying positional value for the 3-phase feedback current and the sign of a feedback current value of one phase in the values of the 3-phase feedback current corresponding to the rectifying positional value for the feedback current of one phase, and then comparing the torque sensor output to the output torque current value.

The disclosed interlock apparatus is advantageous in that upon receiving the 3-phase feedback current values from the current sensor and the rectifying positional values for the 3-bit 3-phase feedback current values from the rectifying positional sensor, the current values of two phases and the rectifying positional value for the 1-bit feedback current of one phase are retrieved for use with a substantially cost effective processor in generating the output torque current value, whereby a cost reduction can be attained in manufacturing the respective ECUs for the electric power steering system.

BRIEF DESCRIPTION OF THE DRAWINGS

The above and other objects, features and advantages of the present disclosure will be more apparent from the following detailed description taken in conjunction with the accompanying drawings, in which:

FIG. 3 is a diagram of an equation for calculating an output torque current value in a conventional interlock apparatus;

FIG. 5 is a diagram for showing the sign of the value of a feedback current of one phase as related to a positional value for rectifying the feedback current of one phase.

DETAILED DESCRIPTION OF THE EXEMPLARY EMBODIMENTS

Figure 1:
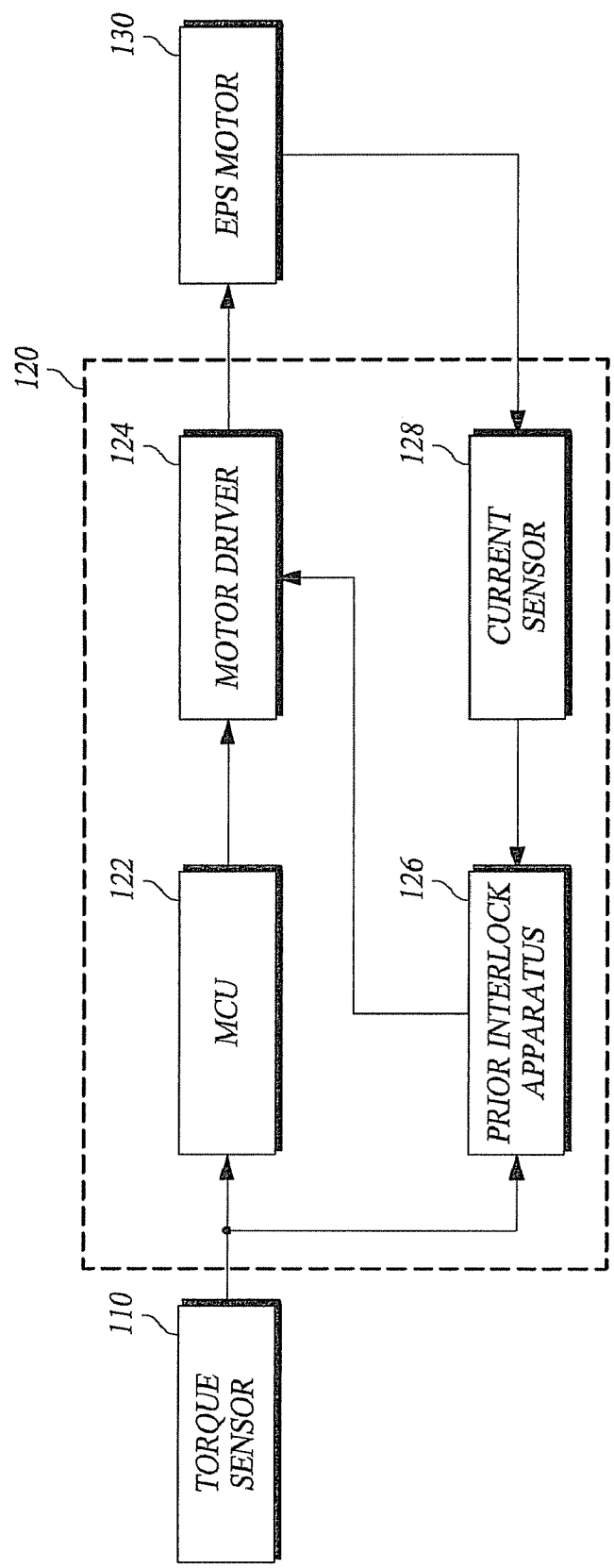
FIG. 1 is a block diagram for schematically showing the internal construction of an electric power steering (EPS) system for vehicles.

Hereinafter, an exemplary embodiment of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Figure 4:
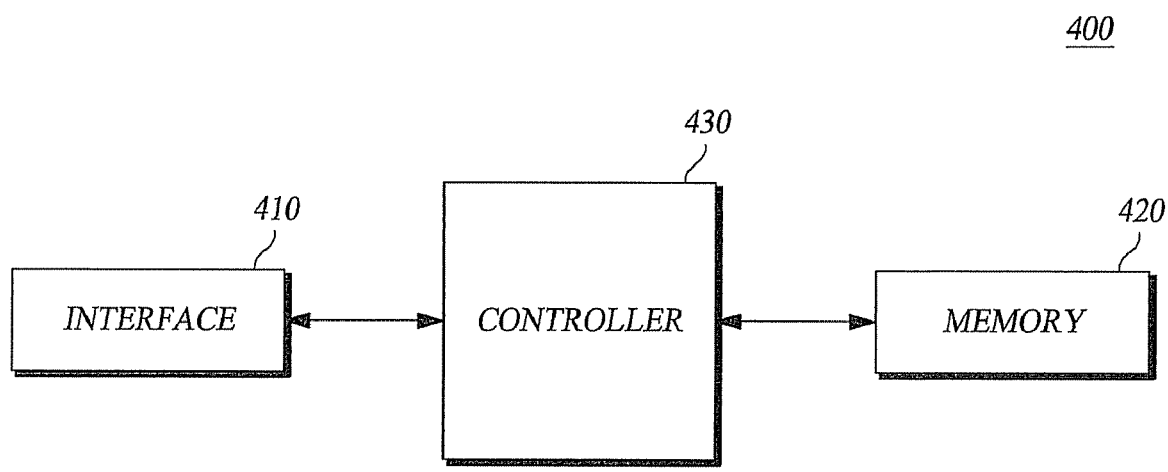
FIG. 4 is a block diagram for schematically showing the internal construction of an interlock apparatus according to an embodiment of the present disclosure.

FIG. 4 is a block diagram for schematically showing the internal construction of an interlock apparatus 400 according to an embodiment of the present disclosure.

Replacing the conventional interlock apparatus 126, the interlock apparatus 400 carries out data communications with the torque sensor 110, the motor driver 124 and the current sensor 128 in due course. The interlock apparatus 400 according to the present embodiment may include an interface 410, a memory 430 and a controller 420.

The interface 410 performs to transceive data to and from various sensors of the electric power steering system including the torque sensor 110, the current sensor 128, a rectifying positional sensor (not shown) as well as transceive data to and from the motor driver 124.

In other word, the interface 410 receives a torque sensor output from the torque sensor 110, a 3-phase feedback current value from the current sensor 128 and a positional value for rectifying the 3-phase feedback current from a rectification positional sensor (not shown) that includes a Hall sensor. In addition, the interface 410 may transmit to the motor driver 124 an interlock signal sent in from a controller 430, which will be described below.

The above rectification positional sensor is adapted to output the rectifying positional values for rectifying the 3-phase feedback current e.g. signal values Ha, Hb and Hc of the Hall sensor for the 3-phase current and provide these values to the interlock apparatus 400 and others of the vehicle where the rectifying positional value may be three bits in size while a single bit may be allocated to a rectifying positional value (e.g. Ha among Ha, Hb and Hc) for a feedback current value of one phase, which corresponds to one of the three phase values of the 3-phase feedback current.

The memory 420 stores an interlock implementing program of the electric power steering system.

The controller 403 then executes the interlock implementing program of the power steering system to calculate the absolute value of the output torque current by using values Ia and Ib of the 3-phase feedback current that includes currents Ia, Ib and Ic, and determines the direction of the output torque current value by using a rectifying positional value for one in three phases of feedback current and the sign of one in three phases of feedback current value corresponding to the same rectifying positional value for the feedback current of one phase, and then a torque sensor output value is compared to the output torque current to perform the control for realizing the interlocking of the power steering system.

Figure 2:
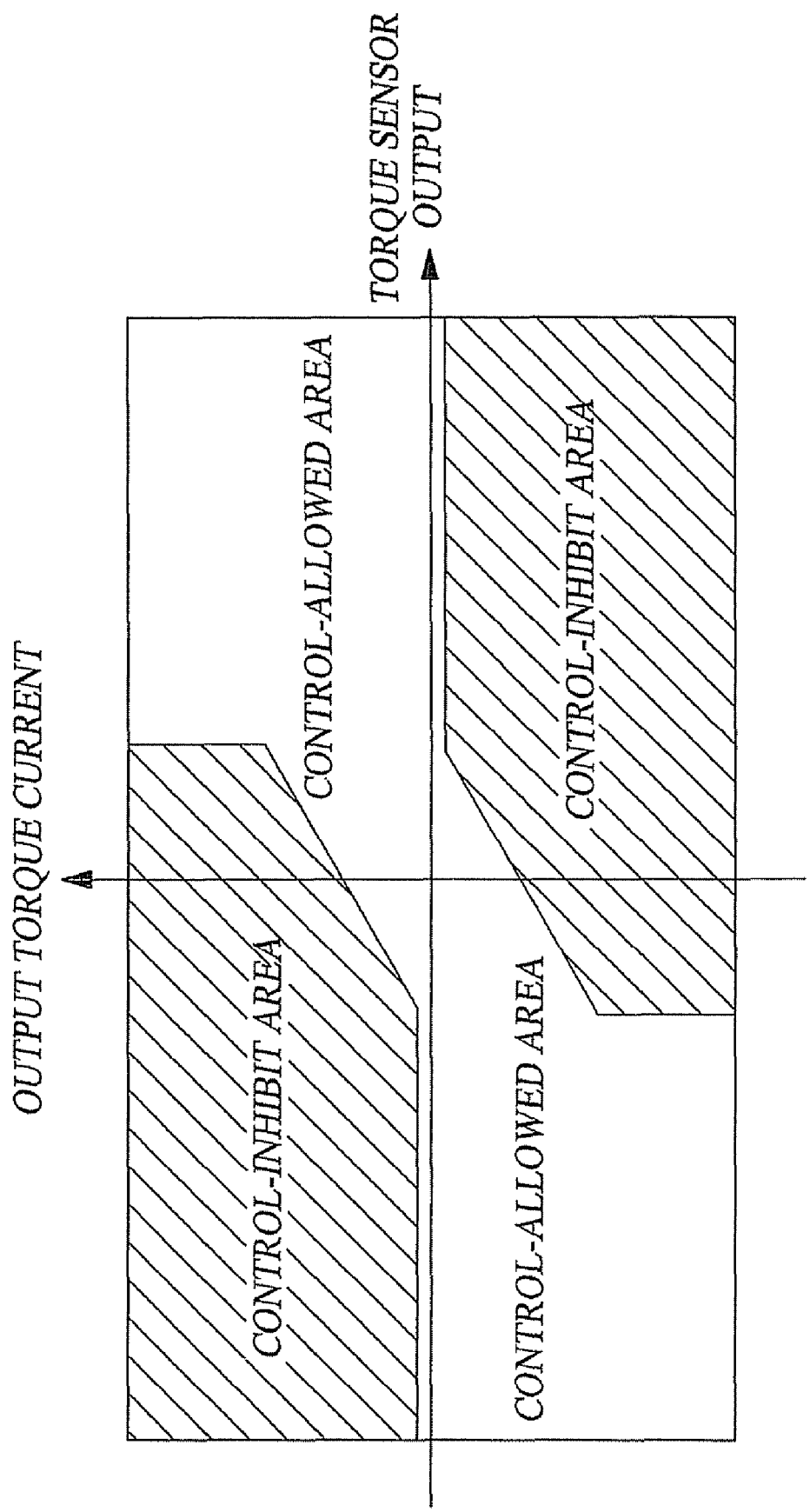
FIG. 2 is a diagram for showing a control-allowed area and a control-inhibit area of an EPS motor.

At this time, the controller 430 generates an interlocking signal to direct the motor driver 124 before delivering the same via the interface 410 to the motor driver 124 if the output torque current value for the torque sensor output value resides in the abnormal premises (control-inhibit area) shown in FIG. 2.

$$i_a^2 + i_b^2 + i_c^2 = \frac{3}{2}(i_q^2 + i_d^2)$$ [Math FIG. 1]

$$i_a^2 + i_b^2 + i_c^2 = \frac{3}{2}i_q^2, \text{ if } i_d = 0$$

$$|i_q| = \sqrt{\frac{2}{3}(i_a^2 + i_b^2 + i_c^2)} = \sqrt{\frac{4}{3}(i_a^2 + i_b^2 + i_a i_b)},$$

$$i_a + i_b + i_c = 0$$

In order to calculate the absolute value of the output torque current, the controller 430 utilizes conditions that the sum of 3-phase feedback current squares equals 3/2 times a square of the output torque current (Iq in FIG. 5) plus a square of the reactive current value (Id in FIG. 5) as in math FIG. 1, that the sum of 3-phase feedback current values equals zero with the 3-phase being in parallel between the respective phases and that MCU 122 of the electric power steering system has the reactive current value controlled to remain zero in order to generate the greatest output torque from the EPS motor 130. Here, the absolute value of the output torque current equals a square root of 4/3 times the sum of Ia square, Ib square and Ia times Ib.

On the other hand, the controller 430 determines the direction of the output torque current value in a way according to the present disclosure as shown in FIG. 5.

From FIG. 5, it may be seen that the direction of the output torque current value is determined as being clockwise in the event that a feedback current of one phase is valued positive while the rectifying positional value for the feedback current of one phase is one and the same rectifying positional value is zero with the feedback current value of one phase turned to negative, and the counterclockwise direction of the output torque current value may be identified if the feedback current of one phase is valued negative while the rectifying positional value for the feedback current of one phase is one and the same rectifying positional value becomes zero with the feedback current of one phase valued positive.

In other word, when the positively signed feedback current value of phase one is concurrent with the rectifying position for the feedback current of phase one valued one while the negatively signed feedback current value of one phase is concurrent with the rectifying position for the feedback current of one phase one valued zero, the operation of EPS motor 130 may be then deemed directing clockwise, and counterclockwise when the negatively signed feedback current value of phase one is concurrent with the rectifying position for the feedback current of one phase valued one while the positively signed feedback current value of one phase is concurrent with the rectifying position for the feedback current of one phase valued zero.

As described, the interlock apparatus 400 according to an embodiment of the present disclosure is able to generate the output torque current value needing to use current values of only two phases and the rectifying positional value for the 1-bit feedback current of one phase out of the 3-phase feedback current value received from the current sensor 128 and the rectifying positional value for the 3-bit 3-phase feedback current value received from the rectifying positional sensor (not shown).

Therefore, the disclosed interlock apparatus 400 lets the electric power steering system to successfully utilize a relatively low-performance processor to the conventional interlock apparatus 126 resulting in a reduced unit manufacturing cost of the electric power steering system ECUs.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

As detailed above, the present disclosure may be applied to the field of electric power steering system where Upon receiving the 3-phase feedback current value from the current sensor and the rectifying positional value for the 3-bit 3-phase feedback current value from the rectifying positional sensor, the current values of two phases and the rectifying positional value for the 1-bit feedback current of one phase are retrieved for use by the interlock apparatus with a substantially cost effective processor in generating the output torque current value, whereby a cost reduction can be attained in manufacturing the ECUs for the electric power steering system.

What is claimed is:

1. An apparatus for implementing an interlock of an electric power steering system comprising:
an interface for receiving a torque sensor output from a torque sensor of the electric power steering system, a 3-phase feedback current including values Ia, Ib and Ic from a current sensor of the electric power steering system, and a rectifying positional value for the 3-phase feedback current from a rectifying positional sensor of the electric power steering system;
a memory for storing a program for implementing the interlock of the electric power steering system; and
a controller for executing a controlled implementation of the interlock of the electric power steering system through executing the program for implementing the interlock to calculate the absolute value of an output torque current value using values Ia and Ib of the 3-phase feedback current, determining the direction of the output torque current by using a rectifying positional value for a feedback current of one phase in the rectifying positional value for the 3-phase feedback current and the sign of a feedback current value of one phase in the values of the 3-phase feedback current corresponding to the rectifying positional value for the feedback current of one phase, and then comparing the torque sensor output to the output torque current value.

2. The apparatus for implementing an interlock of an electric power steering system in claim 1, wherein the controller calculates the absolute value of the output torque current value by utilizing conditions that the sum of the squares of the values of the 3-phase feedback current equals 3/2 times a square of the output torque current plus a square of a reactive current value, that the sum of the values of the 3-phase feedback current equals zero with the 3-phase being in parallel between the respective phases and that a micro controller unit of the electric power steering system has the reactive current value controlled to remain zero in order to generate the greatest output torque from an electric power steering motor.

3. The apparatus for implementing an interlock of an electric power steering system in claim 1, wherein the controller determines the direction of the output torque current value as being clockwise in the event that the feedback current of one phase is valued positive while the rectifying positional value for the feedback current of one phase is one and the same rectifying positional value becomes zero with the feedback current of one phase valued negative, and counterclockwise if the feedback current of one phase is valued negative while the rectifying positional value for the feedback current of one phase is one and the rectifying positional value becomes zero with the feedback current of one phase valued positive.

4. The apparatus for implementing an interlock of an electric power steering system in claim 1, wherein the absolute value of the output torque current value equals a square root of 4/3 times the sum of the Ia square, the Ib square and Ia times Ib.

* * * * *